(12) United States Patent
Kubota

(10) Patent No.: US 9,771,999 B2
(45) Date of Patent: Sep. 26, 2017

(54) MONO-TUBE TYPE HYDRAULIC SHOCK ABSORBER

(71) Applicant: KYB Corporation, Tokyo (JP)

(72) Inventor: Tomoo Kubota, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/904,707

(22) PCT Filed: Jul. 16, 2014

(86) PCT No.: PCT/JP2014/068862
§ 371 (c)(1),
(2) Date: Jan. 13, 2016

(87) PCT Pub. No.: WO2015/037326
PCT Pub. Date: Mar. 19, 2015

(65) Prior Publication Data
US 2016/0169316 A1    Jun. 16, 2016

(30) Foreign Application Priority Data
Sep. 13, 2013  (JP) .................. 2013-190096

(51) Int. Cl.
*F16F 9/06* (2006.01)
*B60G 13/08* (2006.01)

(52) U.S. Cl.
CPC .............. *F16F 9/061* (2013.01); *B60G 13/08* (2013.01); *F16F 9/067* (2013.01); *B60G 2202/24* (2013.01); *B60G 2206/41* (2013.01); *F16F 2222/12* (2013.01)

(58) Field of Classification Search
CPC .......... F16F 9/061; F16F 9/06; F16F 2222/12; F16F 9/081
See application file for complete search history.

(56) References Cited

U.S. PATENT DOCUMENTS

| 1,524,715 A | * | 2/1925 | Klatzke | F02F 3/022 92/160 |
| 2,882,592 A | * | 4/1959 | Carbon | F16F 9/43 188/269 |
| 2,982,538 A | * | 5/1961 | Carbon | B60G 15/12 267/64.15 |

(Continued)

FOREIGN PATENT DOCUMENTS

| JP | 47-015389 Y1 | 5/1972 |
| JP | 54-035985 U | 3/1979 |

(Continued)

*Primary Examiner* — Bradley King
*Assistant Examiner* — James Hsiao
(74) *Attorney, Agent, or Firm* — Rabin & Berdo, P.C.

(57) ABSTRACT

A mono-tube type hydraulic shock absorber includes a cylinder, a free piston that partitions the inside of the cylinder into a liquid chamber in which a hydraulic fluid is filled and a gas chamber in which a gas is filled, a piston slidably inserted into the cylinder, the piston partitioning the liquid chamber into two working chambers, a sealing ring provided on an outer periphery of the free piston, the sealing ring being configured to seal between the cylinder and the free piston, and a lubricating oil enclosed within the gas chamber to lubricate between the sealing ring and the cylinder.

5 Claims, 3 Drawing Sheets

(56) References Cited

U.S. PATENT DOCUMENTS

| | | | | |
|---|---|---|---|---|
| 3,316,558 A * | 5/1967 | Mortensen | A61F 2/64 | 188/317 |
| 3,330,549 A * | 7/1967 | Creasy | B64G 1/646 | 188/322.13 |
| 3,388,883 A * | 6/1968 | Wossner | A47B 9/10 | 188/300 |
| 3,762,514 A * | 10/1973 | Freitag | F16F 9/56 | 188/280 |
| 3,817,566 A * | 6/1974 | Keijzer | F16F 9/06 | 188/314 |
| 4,451,978 A * | 6/1984 | Ludwig | F16F 9/02 | 29/776 |
| 4,854,554 A * | 8/1989 | Ludwig | E05F 1/1292 | 16/66 |
| 4,921,225 A * | 5/1990 | Ludwig | E05F 1/1292 | 188/269 |
| 5,330,132 A * | 7/1994 | Lucienne | B64C 25/60 | 188/322.13 |
| 5,682,966 A * | 11/1997 | Cabrerizo-Pariente | B62K 25/04 | 188/269 |
| 5,984,060 A * | 11/1999 | Clark | B60G 3/01 | 188/269 |
| 6,179,098 B1 * | 1/2001 | Hayakawa | B60G 17/002 | 188/274 |
| 6,318,524 B1 * | 11/2001 | Lutz | B60G 17/01933 | 188/284 |
| 6,328,144 B1 * | 12/2001 | Hayakawa | B60G 15/12 | 188/274 |
| 6,966,412 B2 * | 11/2005 | Braswell | F16F 9/5165 | 188/286 |
| 7,374,028 B2 * | 5/2008 | Fox | F16F 9/44 | 188/322.13 |
| 2004/0089507 A1 * | 5/2004 | Harbu | F16F 9/061 | 188/322.13 |
| 2004/0145099 A1 * | 7/2004 | Kojima | F16F 9/061 | 267/64.15 |
| 2005/0023093 A1 * | 2/2005 | Leiphart | B60G 17/08 | 188/283 |
| 2006/0006030 A1 * | 1/2006 | Satou | B60G 15/067 | 188/317 |
| 2006/0180418 A1 * | 8/2006 | Kojima | F15B 1/103 | 188/314 |
| 2008/0314706 A1 * | 12/2008 | Lun | F16F 9/067 | 188/267.2 |
| 2011/0278117 A1 * | 11/2011 | Wu | F16F 9/3415 | 188/269 |
| 2013/0341842 A1 * | 12/2013 | Weber | F16F 9/061 | 267/127 |
| 2015/0137436 A1 * | 5/2015 | Fitterling | F16F 9/516 | 267/140.13 |
| 2015/0233113 A1 * | 8/2015 | Ueno | E04B 1/98 | 52/167.1 |

FOREIGN PATENT DOCUMENTS

| | | |
|---|---|---|
| JP | 02-145334 U | 12/1990 |
| JP | 08-152037 A | 6/1996 |
| JP | 2004-132428 A | 4/2004 |
| JP | 2009-097681 A | 5/2009 |
| JP | 2013-133845 A | 7/2013 |

* cited by examiner

MONO-TUBE TYPE HYDRAULIC SHOCK ABSORBER

TECHNICAL FIELD

The present invention relates to a mono-tube type hydraulic shock absorber.

BACKGROUND ART

A mono-tube type hydraulic shock absorber is generally configured to include the following: a cylinder, a free piston that is slidably inserted into the cylinder to partition the inside of the cylinder into a liquid chamber and a gas chamber, a piston that is slidably inserted into the cylinder to partition the liquid chamber into an extension-side chamber and a compression-side chamber, and a piston rod that is connected at one end to the piston and is movably inserted into the cylinder. Such a mono-tube type hydraulic shock absorber is used by, for example, interposing it between a vehicle body and a vehicle axle of an automobile.

In the above-described mono-tube type hydraulic shock absorber, the piston rod moves into and out of the cylinder during extension and compression. Therefore, the free piston displaces within the cylinder to change the capacity of the gas chamber, and this compensates for the volume of the piston rod moving into and out of the cylinder.

An annular groove is formed on the outer periphery of the free piston, and an O ring is fitted therein. In the above-described mono-tube type hydraulic shock absorber, the O ring seals between the cylinder and the free piston, and thereby gas within the gas chamber can be prevented from leaking into the liquid chamber (for example, refer to JP8-152037A).

SUMMARY OF INVENTION

In the above-described mono-tube type hydraulic shock absorber, there are cases in which the O ring fits closely to the cylinder causing friction, and thus only the free piston moves relative to the cylinder. Therefore, in the above-described mono-tube type hydraulic shock absorber, a supply/discharge passage in communication with the annular groove is provided on the outer periphery on the liquid chamber side of the free piston so that the free piston can move parallel relative to the O ring in the axial direction.

However, in the above-described mono-tube type hydraulic shock absorber, the frictional forces that occur between the O ring and the cylinder are still large. Therefore, there has been a problem in that, particularly during the compression operation, the free piston cannot smoothly displace relative to the cylinder, and thus the damping force generated by the mono-tube type hydraulic shock absorber may change abruptly. For example, when using the mono-tube type hydraulic shock absorber by interposing it between a vehicle body and a vehicle axle of a vehicle, abrupt changes in the damping force may negatively affect the riding comfort of the vehicle.

An object of the present invention is to provide a mono-tube type hydraulic shock absorber that can realize smooth displacement of the free piston and alleviate abrupt changes in the damping force.

According to one aspect of the present invention, a mono-tube type hydraulic shock absorber includes a cylinder, a free piston that partitions the inside of the cylinder into a liquid chamber in which a hydraulic fluid is filled and a gas chamber in which a gas is filled, a piston slidably inserted into the cylinder, the piston partitioning the liquid chamber into two working chambers, a sealing ring provided on an outer periphery of the free piston, the sealing ring being configured to seal between the cylinder and the free piston, and a lubricating oil enclosed within the gas chamber to lubricate between the sealing ring and the cylinder.

DESCRIPTION OF EMBODIMENTS

Figure 1:
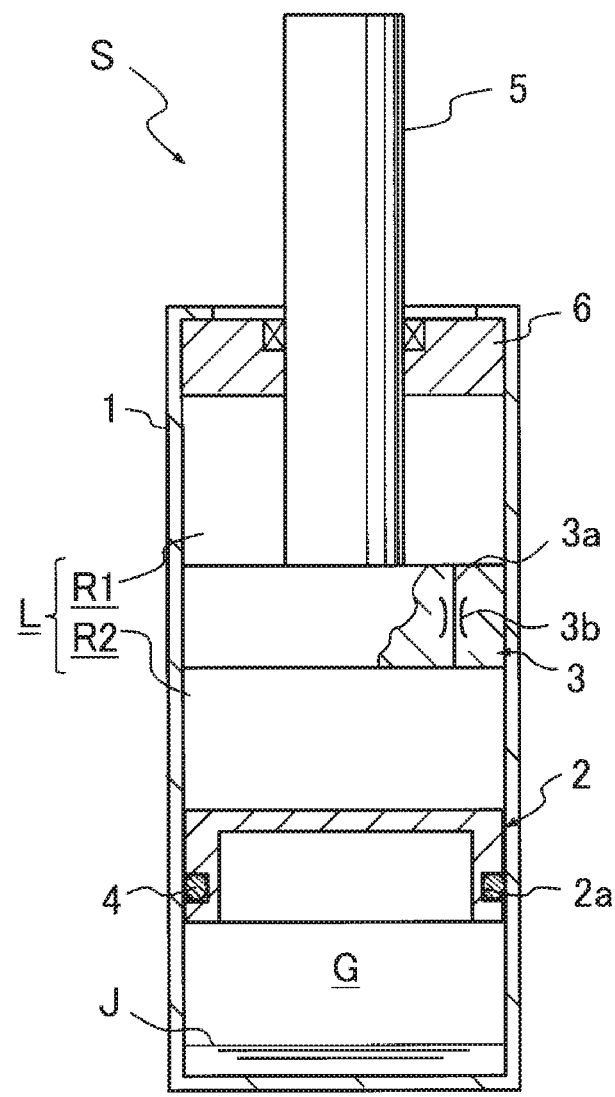
FIG. 1 is a cross-section view of a mono-tube type hydraulic shock absorber according to an embodiment of the present invention.

A mono-tube type hydraulic shock absorber S according to an embodiment of the present invention will now be explained below referring to the drawings.

As shown in FIG. 1, the mono-tube type hydraulic shock absorber S includes a cylinder 1, a free piston 2 that partitions the inside of the cylinder 1 into a liquid chamber L and a gas chamber G, a piston 3 that is slidably inserted into the cylinder 1 and partitions the liquid chamber L into two working chambers which are an extension-side chamber R1 and a compression-side chamber R2, an O ring 4 serving as a sealing ring that is fitted into an annular groove 2*a* provided on an outer periphery of the free piston 2 to seal between the cylinder 1 and the free piston 2, and a lubricating oil J that is enclosed within the gas chamber G.

Hydraulic oil or the like that serves as a hydraulic fluid is filled into the extension-side chamber R1 and the compression-side chamber R2. For example, an inactive gas such as nitrogen is filled at a predetermined pressure into the gas chamber G.

The mono-tube type hydraulic shock absorber S includes a piston rod 5 that is connected at one end to the piston 3 and is movably inserted into the cylinder 1.

The piston rod 5 is provided to protrude to the outside of the cylinder 1. The piston rod 5 is supported by an annular rod guide 6 that is provided on a top end of the cylinder 1 to seal the inside of the cylinder 1.

The mono-tube type hydraulic shock absorber S can be interposed between a vehicle body and a vehicle axle of a vehicle via attachment parts (not illustrated) provided on a top end of the piston rod 5 and a bottom end of the cylinder 1.

A passage 3*a* that enables communication between the extension-side chamber R1 and the compression-side chamber R2 is provided in the piston 3. A damping force generating element 3*b* is provided in the passage 3*a*.

The damping force generating element 3*b* should impart resistance to a flow of hydraulic oil when the hydraulic oil is passing through the passage 3*a* in order to generate a prescribed pressure loss. Specifically, for example, a damping valve such as an orifice or a leaf valve can be used as the damping force generating element 3*b*.

In FIG. 1, only one passage 3*a* is provided. However, multiple passages 3*a* can be provided. Further, a unidirectional passage that allows only a flow of hydraulic oil from the extension-side chamber R1 toward the compression-side chamber R2 and a unidirectional passage that allows only a flow of hydraulic oil from the compression-side chamber R2 toward the extension-side chamber R1 can be provided in parallel, and a damping force generating element can be provided in each of these passages.

The free piston 2 has a closed-end cylinder shape, and the annular groove 2a is provided along the peripheral direction on the outer periphery of the free piston 2. The O ring 4 is fitted as a sealing ring into the annular groove 2a.

The O ring 4 seals between the inner periphery of the cylinder 1 and the free piston 2. In other words, the O ring 4 tightly seals the liquid chamber L and the gas chamber G. Thereby, the mono-tube type hydraulic shock absorber S prevents gas of the gas chamber G from leaking into the liquid chamber L and prevents hydraulic oil of the liquid chamber L from leaking into the gas chamber G. Besides the O ring 4, an annular sealing member such as annular packing or the like can be also be used as the sealing ring.

In the mono-tube type hydraulic shock absorber S, when the piston 3 moves in the up-down direction in FIG. 1 relative to the cylinder 1, hydraulic oil moves through the passage 3a from the extension-side chamber R1 (compression-side chamber R2), whose capacity decreases along with the movement of the piston 3, to the compression-side chamber R2 (extension-side chamber R1), whose capacity increases along with the movement of the piston 3. At this time, the mono-tube type hydraulic shock absorber S imparts resistance by the damping force generating element 3b to the flow of hydraulic oil passing through the passage 3a in order to generate a pressure loss, and thereby generates a pressure difference between the extension-side chamber R1 and the compression-side chamber R2 to exert a damping force.

The mono-tube type hydraulic shock absorber S also compensates for a capacity change within the cylinder 1 caused by the piston rod 5 moving into and out of the cylinder 1 with a capacity change of the gas chamber G caused by the free piston 2 displacing in the axial direction within the cylinder 1.

The lubricating oil J is enclosed together with the gas in the gas chamber G.

The amount of lubricating oil J is restricted so that it does not affect the compression operation when the mono-tube type hydraulic shock absorber S reaches maximum compression. In other words, during extension and compression, the mono-tube type hydraulic shock absorber S compensates for the volume of the piston rod 5 that moves into and out of the cylinder 1 with a volume change of the gas in the gas chamber G, and when the mono-tube type hydraulic shock absorber S reaches maximum compression, the gas chamber G whose capacity decreases is prevented from being filled entirely with the lubricating oil J.

This is because if the entire capacity of the gas chamber G is filled with the lubricating oil J, which exhibits poor compressibility, before the mono-tube type hydraulic shock absorber S reaches maximum compression, it becomes difficult to compress the mono-tube type hydraulic shock absorber S any further.

The mono-tube type hydraulic shock absorber S constituted as described above is used by, for example, interposing it between a vehicle body and a vehicle axle of a vehicle. The mono-tube type hydraulic shock absorber S exerts a damping force by extending/compressing relative to the input of oscillation from the vehicle body and vehicle wheels, and thereby suppresses oscillation of the vehicle body and vehicle wheels.

Since the mono-tube type hydraulic shock absorber S is used to suppress oscillation, external oscillations are input therein. When external oscillations are input into the mono-tube type hydraulic shock absorber S, the lubricating oil J is shaken within the gas chamber G and adheres to the inner peripheral surface of the cylinder 1. Thereby, the inner peripheral surface within the gas chamber G of the cylinder 1 can be lubricated.

In particular, when the mono-tube type hydraulic shock absorber S is compressed, the piston rod 5 penetrates into the cylinder 1, and thus the free piston 2 displaces accordingly in the downward direction in FIG. 1 relative to the cylinder 1, i.e. a direction to compress the gas chamber G. Herein, an oil film is formed by the lubricating oil J on the inner peripheral surface of the cylinder 1 within the gas chamber G. Therefore, the space between the O ring 4 and the cylinder 1 is lubricated by the lubricating oil J, and the free piston 2 can displace smoothly relative to the cylinder 1 in a direction to compress the gas chamber G.

Thereby, in the mono-tube type hydraulic shock absorber S according to the present embodiment, since the space between the O ring 4 and the cylinder 1 is lubricated by the lubricating oil J and the free piston 2 can move smoothly, abrupt changes in the damping force can be alleviated. Accordingly, when the mono-tube type hydraulic shock absorber S is used by interposing it between a vehicle body and a vehicle axle of a vehicle so as to incorporate it into the vehicle's suspension, the riding comfort of the vehicle can be improved.

Figure 2:
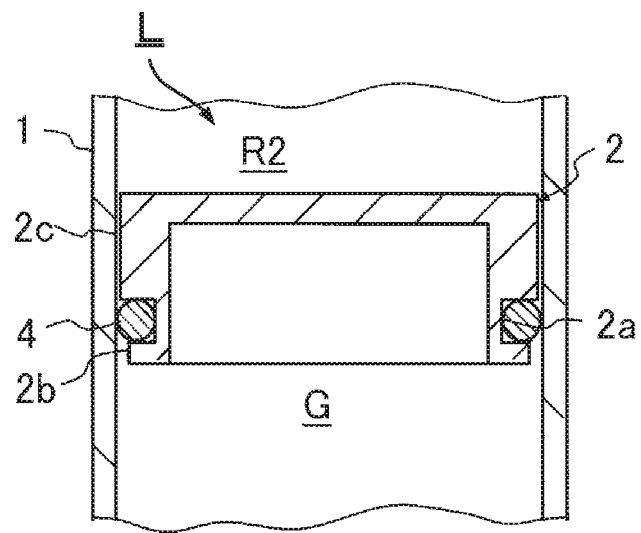
FIG. 2 illustrates an alternative embodiment of a free piston.

As shown in FIG. 2, if the outer diameter on the gas chamber G side from the annular groove 2a of the free piston 2 is made to be smaller so as to increase the clearance between the cylinder 1 and the outer periphery of the free piston 2, the lubricating oil J can be delivered to the part of the O ring 4 that slidingly contacts the cylinder 1. Conversely, if the clearance between the free piston 2 and the cylinder 1 is decreased, inclination of the free piston 2 relative to the cylinder 1 can be suppressed, and thus the operation in which the free piston 2 displaces relative to the cylinder 1 can be stabilized.

Accordingly, by making the outer diameter of an outer periphery 2b of the free piston 2, which is more toward the gas chamber G side from the annular groove 2a, smaller than the outer diameter of an outer periphery 2c of the free piston 2, which is more toward the liquid chamber L side from the annular groove 2a, and decreasing the clearance between the outer periphery 2c on the liquid chamber L side from the annular groove 2a and the cylinder 1, the lubricating oil J can be easily delivered to the O ring 4 and stable operation of the free piston 2 can be realized.

In the present embodiment, an axial direction distance from the end on the gas chamber G side of the free piston 2 to the annular groove 2a is shorter than an axial direction distance from the end on the liquid chamber L side of the free piston 2 to the annular groove 2a. Therefore, the area in which the clearance between the cylinder 1 and the free piston 2 is decreased can be lengthened, and the distance over which the lubricating oil J passes between the cylinder 1 and the free piston 2 before it reaches the O ring 4 can be shortened. Thus, the lubricating effect and the operation stability of the free piston 2 can be further enhanced.

Figure 3:
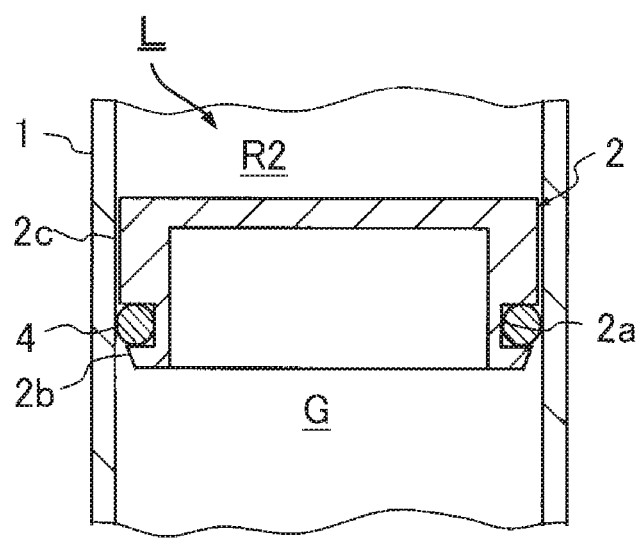
FIG. 3 illustrates another alternative embodiment of a free piston.

As shown in FIG. 3, if the outer periphery 2b on the gas chamber G side from the annular groove 2a is configured to taper such that the outer diameter decreases moving toward the gas chamber G side end, the lubricating oil J can be more easily delivered to the O ring 4. Thus, a strong lubricating effect can be obtained.

The coefficient of friction when lubricating the cylinder 1 and the O ring 4 with the lubricating oil J is preferably less than the coefficient of friction when lubricating the cylinder 1 and the O ring 4 with the hydraulic oil filled in the extension-side chamber R1 and the compression-side chamber R2, which are the working chambers. In other words, the lubricating oil J preferably has a higher lubricity than the hydraulic oil. Thereby, even if the hydraulic oil has poor lubricity, the free piston 2 can be made to displace smoothly relative to the cylinder 1 by lubricating between the O ring 4 and the cylinder 1 with the lubricating oil J. Herein, the lubricity can be measured by an evaluation method using a hydraulic pump (ASTM D2282) or an evaluation such as a four ball test (JIS K2519, ASTM D2596-87), an FZG gear test (DIN 51354), and the like. Thus, the lubricity of the lubricating oil J should be higher than the lubricity of the hydraulic oil based on the above-mentioned evaluation tests.

Embodiments of the present invention were described above, but the above embodiments are merely examples of applications of the present invention, and the technical scope of the present invention is not limited to the specific constitutions of the above embodiments.

For example, in the above-described embodiment, the closed-end cylinder-shaped free piston 2 is arranged so that the inside is oriented toward the gas chamber G side. However, the free piston 2 may also be arranged in the opposite orientation so that the inside is oriented toward the liquid chamber L side.

Figure 4:
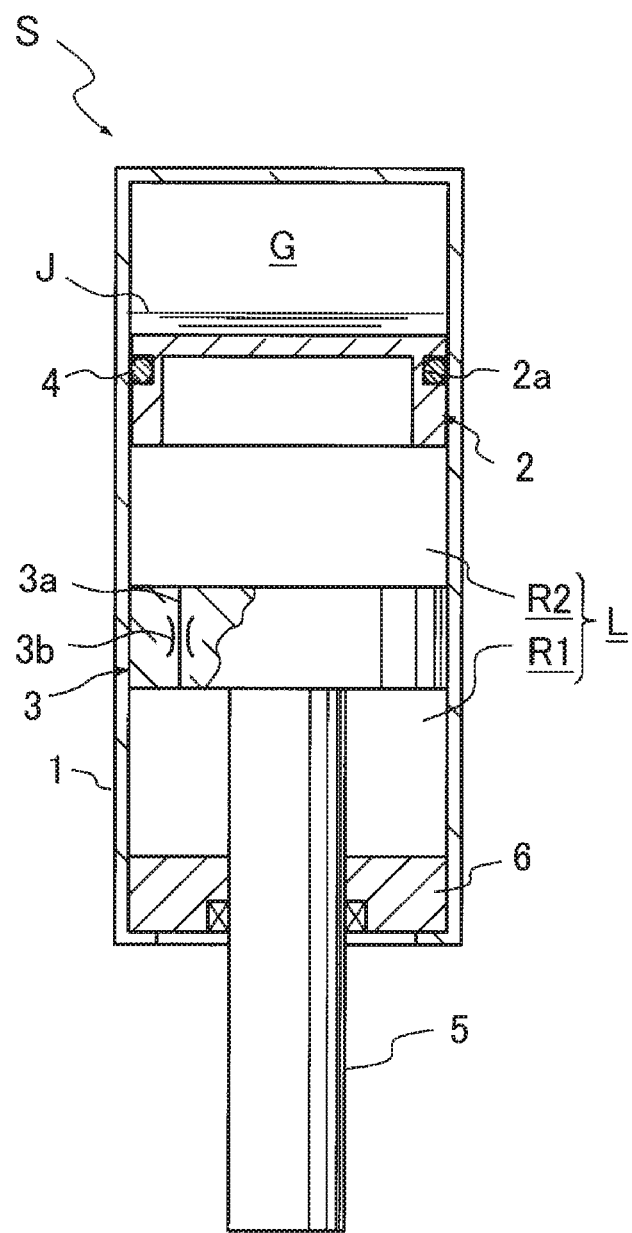
FIG. 4 illustrates an alternative embodiment of the mono-tube type hydraulic shock absorber.

As shown in FIG. 4, the mono-tube type hydraulic shock absorber S may also be arranged in an inverted manner, or in other words with the gas chamber G located above the liquid chamber L. In this case, the lubricating oil J necessarily pools directly above the free piston 2, and thus the O ring 4 is always in contact with the lubricating oil J. Thereby, the space between the O ring 4 and the cylinder 1 can be constantly lubricated, and thus the displacement operation of the free piston 2 relative to the cylinder 1 becomes even smoother. Therefore, abrupt changes in the damping force generated by the mono-tube type hydraulic shock absorber S can be further alleviated.

In this case, if the free piston 2 has a closed-end cylinder shape as in the above-described embodiment, the space between the O ring 4 and the cylinder 1 can be constantly lubricated even if the amount of lubricating oil J that is enclosed is small by orienting the inside of the free piston 2 toward the liquid chamber L side and orienting the bottom of the free piston 2 toward the gas chamber G side. Conversely, if the inside is oriented toward the gas chamber G side, the lubricating oil J will pool inside the free piston 2, and thus the amount of lubricating oil J that is enclosed must be greater than the capacity of the inside of the free piston 2 in order to achieve constant lubrication. Therefore, by arranging the free piston 2 so that the inside is oriented toward the liquid chamber L side, the amount of the lubricating oil J can be reduced.

In the above-described embodiment, the free piston 2 has a closed-end cylinder shape, but it can also have other shapes.

As the hydraulic fluid, electrorheological fluid and magnetorheological fluid can also be used. In this case, the damping force generating element 3b provided to the piston 3 can be configured to produce an electrical field or magnetic field corresponding to the hydraulic fluid passing through the passage 3a.

In the above-described embodiment, the passage 3a is a hole that penetrates through the piston 3 from top to bottom. However, a gap can also be formed between the cylinder 1 and the piston 3, and a passage can be constituted by this gap.

With respect to the above description, the contents of application No. 2013-190096, with a filing date of Sep. 13, 2013 in Japan, are incorporated herein by reference.

The invention claimed is:

1. A mono-tube type hydraulic shock absorber comprising:
    a cylinder;
    a free piston that partitions the inside of the cylinder into a liquid chamber in which a hydraulic fluid is filled, and a gas chamber in which a gas is filled;
    a piston slidably inserted into the cylinder, the piston partitioning the liquid chamber into two working chambers;
    a sealing ring provided on an outer periphery of the free piston, the sealing ring being configured to seal between the cylinder and the free piston; and
    a lubricating oil enclosed within the gas chamber to lubricate between the sealing ring and the cylinder,
    wherein the free piston has a free piston body and the sealing ring attached to the free piston body,
    an annular groove is provided on the outer periphery of the free piston body and the sealing ring is fitted into the annular groove, the annular groove defined by a first wall, a second wall, and a base extending between the first and second walls, the first wall being closer to the gas chamber than the second wall, and
    an outer diameter of the outer periphery of the free piston body adjacent to the first wall of the annular groove is smaller than an outer diameter of the outer periphery of the free piston body adjacent to the second wall of the annular groove, such that a height of the first wall of the annular groove is less than a height of the second wall of the annular groove, from the base of the annular groove to the outer periphery of the free piston body.

2. The mono-tube type hydraulic shock absorber according to claim 1, wherein the outer periphery of the free piston body is tapered from the first wall of the annular groove to an axial end of the free piston body on the gas chamber side, such that the outer diameter of the free piston body decreases moving axially from the first wall of the annular groove toward a gas chamber side axial end of the free piston body.

3. The mono-tube type hydraulic shock absorber according to claim 1, wherein the lubricating oil has a higher lubricity than the hydraulic fluid.

4. The mono-tube type hydraulic shock absorber according to claim 1, wherein the gas chamber is arranged above the liquid chamber.

5. A mono-tube type hydraulic shock absorber comprising:
    a cylinder;
    a free piston partitioning the inside of the cylinder into a liquid chamber having a hydraulic fluid therein, and a gas chamber having a gas therein;
    a piston slidably inserted into the cylinder, the piston partitioning the liquid chamber into two working chambers;
    a sealing ring provided on an outer periphery of the free piston, the sealing ring being configured to seal between the cylinder and the free piston; and
    a lubricating oil enclosed within the gas chamber to lubricate between the sealing ring and the cylinder,
    wherein the free piston has a free piston body and the sealing ring attached to the free piston body,
    wherein an annular groove is provided on the outer periphery of the free piston body and the sealing ring is fitted into the annular groove, the annular groove defined by a first wall, a second wall, and a base extending between the first and second walls, the first wall being closer to the gas chamber than the second wall, wherein the free piston body has
- a gas chamber side disposed between the gas chamber and the sealing ring, and
- a liquid chamber side disposed between the liquid chamber and the sealing ring, and wherein a maximum outer diameter of the entire free piston body, between the first wall and the an axial end of the free piston body on a gas chamber side of the free piston body, is smaller than a maximum outer diameter of the entire outer diameter of the free piston between the second wall and an axial end of the free piston body on a liquid chamber side of the free piston body.

* * * * *